(12) United States Patent
Morinaga et al.

(10) Patent No.: US 7,359,620 B2
(45) Date of Patent: Apr. 15, 2008

(54) INFORMATION TRANSMITTING METHOD, INFORMATION PROCESSING METHOD AND APPARATUS, AND INFORMATION RECORDING AND REPRODUCING METHOD AND APPARATUS

(75) Inventors: Takeo Morinaga, Kanagawa (JP); Keiji Yuzawa, Saitama (JP); Atsushi Kagami, Tokyo (JP); Iwao Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1181 days.

(21) Appl. No.: 09/843,415

(22) Filed: Apr. 26, 2001

(65) Prior Publication Data

US 2001/0036269 A1 Nov. 1, 2001

(30) Foreign Application Priority Data

Apr. 28, 2000 (JP) ............................ P2000-129215
Jul. 11, 2000 (JP) ............................ P2000-209519

(51) Int. Cl.
*H04N 5/91* (2006.01)
(52) U.S. Cl. ........................... 386/95; 386/111; 386/112
(58) Field of Classification Search ................ 386/46, 386/98, 111, 112, 125, 126, 68, 70
See application file for complete search history.

(56) References Cited

U.S. PATENT DOCUMENTS 5,010,546 A * 4/1991 Kato ........................... 370/469
5,715,176 A * 2/1998 Mobini ........................ 709/236
5,991,503 A * 11/1999 Miyasaka et al. ........... 386/111
6,002,834 A * 12/1999 Hirabayashi et al. ......... 386/70
6,031,574 A 2/2000 Müller
6,628,890 B1 * 9/2003 Yamamoto et al. ........... 386/68
6,865,747 B1 * 3/2005 Mercier ....................... 725/94

FOREIGN PATENT DOCUMENTS

EP 0 695 098 1/1996
EP 0 996 288 4/2000

OTHER PUBLICATIONS

Doh Sang-Yoon et al: "Fast forward and fast rewind play system based on the MPEG system stream with new concept" Multimedia Computing and Systems, 1999. IEEE International Conference on Florence, Italy Jun. 7-11, 1999, Los Alamitos, CA, USA,IEEE Comput. Soc, US, Jun. 7, 1999, pp. 846-850, XP010519500 ISBN: 0-7695-0253-9.

* cited by examiner

*Primary Examiner*—Huy Nguyen
(74) *Attorney, Agent, or Firm*—Frommer Lawrence & Haug LLP; William S. Frommer; Thomas F. Presson (57) ABSTRACT

For example, in case of distributing contents by BS broadcast and recording a transmitted TS stream into a storage device, even if the stream has been encrypted, a trick play can be easily performed. A start marker packet and an end marker packet are sent just before and just after the start of an I picture. A unique PID is written in each of the start marker packet and end marker packet. Upon reception, a video packet of the I picture is identified by identifying the start marker packet and end marker packet. Upon recording, a TS packet of the I picture is detected from the start marker packet and end marker packet and marked. Thus, upon reproduction, a cluster including the TS packet of the I picture is known and a trick play can be performed by reproducing the I picture.

14 Claims, 9 Drawing Sheets

INFORMATION TRANSMITTING METHOD, INFORMATION PROCESSING METHOD AND APPARATUS, AND INFORMATION RECORDING AND REPRODUCING METHOD AND APPARATUS

BACKGROUND OF THE INVENTION

1. Field of the Invention

The invention relates to information transmitting method and apparatus, information processing method and apparatus, information recording method and apparatus, and information recording and reproducing method and apparatus which are suitable for use in a system such that in BS (Broadcast Satellite) broadcast, for example, information of contents is distributed by using a time zone after the broadcast is finished at night and the information of the contents is stored into a storage unit and reproduced.

2. Description of the Related Arts

In digital BS broadcast, a plurality of programs are broadcasted by using a band of one transponder. Among the ordinary programs which are broadcasted by the digital BS broadcast, there is a program whose broadcasting time zone is limited to the daytime and whose broadcast is finished at night. Therefore, after the ordinary broadcast is finished at night, a space band is caused in the band of the transponder. There is, accordingly, considered a method of distributing contents by effectively using the space band of the transponder that is caused after the end of the broadcast at night as mentioned above.

That is, for example, eight transponders of a band of 30 Mbps are installed in a digital BS satellite. For example, programs of six channels in case of SDTV (Standard Definition Television) broadcast and programs of two channels in case of HDTV (High Definition Television) broadcast can be transmitted by one transponder. The ordinary broadcast is not performed in a time zone, for example, from 1:00 at night to 5:00 in the morning.

As mentioned above, for a time interval during which the space band is caused in the transponder after the end of the broadcast at night, broadcast for contents distribution is performed by using the space band of the transponder. Information of the contents is received by a receiver in each home and temporarily stored in a storage device such as a hard disk drive provided for the receiver in each home. The information of the contents is read out from the storage device in a reception terminal in each home and reproduced by a television receiver in each home.

By sending the information of the contents by using the space band of the transponder for the time interval during which the space band is caused in the transponder after the end of the broadcast at night and storing the contents information into the storage device in the reception terminal in each home as mentioned above, the contents information can be transmitted at a low cost by effectively using the space band of the transponder.

In such a system, however, since a transport stream of MPEG2 is recorded as it is into the storage device, it is difficult to perform a trick play such as cue/review or the like.

That is, according to a video packet of MPEG2, an I picture encoded in its frame (or field), a P picture encoded by using a previous frame (or field), and a B picture encoded by using previous and subsequent frames (or fields) are sent. It is necessary to use the I picture when the trick play such as cue/review or the like is performed. Therefore, in case of recording the MPEG2 video stream into the storage device as it is, when the trick play is performed, the video packet of the I picture has to be certainly reproduced.

Therefore, there is a method whereby a picture type is identified from a picture coding type described in a TS packet and, in case of the I picture, code mark bits are set and the number of code mark bits is counted and added as a code mark value into index information and recorded. With such a method, the I picture is reproduced from the index information and the trick play can be performed. In such an example, however, the picture type is identified from the picture coding type described in the TS packet and, if the picture coding type cannot be detected, it is difficult to perform the trick play. According to the system in which the contents is distributed by using the space band of the transponder when the space band is caused in the transponder after the end of the broadcast as mentioned above, a method of encrypting the stream in order to protect the contents is considered. If the stream has been encrypted, it is impossible to identify the I picture by analyzing the picture coding type as mentioned above.

OBJECTS AND SUMMARY OF THE INVENTION

It is, therefore, an object of the invention to provide an information transmitting method, information processing method and apparatus, and information recording and reproducing method and apparatus, in which in case of recording a TS stream sent to a storage device, even if the stream has been encrypted, a trick play can be easily performed.

According to the first aspect of the invention, there is provided an information transmitting method whereby a video packet comprising image data encoded in a frame or a field, image data encoded between forward directional frames or fields, and image data encoded between bidirectional frames or fields is transmitted as an encrypted transport packet, wherein a first marker packet is added to a position just before a packet including an image encoded in the frame or field and a resultant transport packet is transmitted as a transport stream.

According to the second aspect of the invention, there are provided information processing method and apparatus, in which a stream of a video packet comprising image data encoded in a frame or a field, image data encoded between forward directional frames or fields, and image data encoded between bidirectional frames or fields is received and recorded into a storage device, wherein a first marker packet which is sent just before the transport stream packet including an image encoded in the frame or field is detected from the received stream, and the transport stream packet including the intraframe or intrafield encoded image is identified from the first marker packet.

According to the third aspect of the invention, there are provided information recording and reproducing method and apparatus, in which a stream of a video packet comprising image data encoded in a frame or a field, image data encoded between forward directional frames or fields, and image data encoded between bidirectional frames or fields is recorded into a storage device every predetermined number of recording units and the stream is reproduced from the storage device, wherein a first marker packet which is sent just before the transport stream packet including an image encoded in the frame or field is detected from the received stream, the transport stream packet including the intraframe or intrafield encoded image data is identified from the first marker packet, information showing the intraframe or intrafield encoded image data is added to the transport stream packet on the basis a result of the identification, the added information showing the intraframe or intrafield encoded image data is counted every recording unit into the storage device, and a count result is added every recording recording unit into the storage device.

A start marker packet and an end marker packet are sent just before and just after the start of the I picture. A unique PID is written in each of the start marker packet and end marker packet. Upon reception, the video packet of the I picture is identified by identifying the start marker packet and end marker packet.

Upon recording, a marker is set at each of a start position and an end position of the I picture in a log memory. Upon reproduction, a cluster included in a TS packet of the I picture is known from the contents in the log memory, so that a trick play can be performed.

Upon recording, the TS packet of the I picture is detected from the start marker packet and end marker packet, a code mark is set into the TS packet of the I picture, and when recording data into a hard disk drive on a cluster unit basis, the number of code marks is counted and a count value of the code marks is added to index information. Upon reproduction, the cluster included in the TS packet of the I picture is known from the index information, so that the trick play can be performed.

As mentioned above, since the start marker packet and end marker packet having the unique PIDs are sent just before and just after the start of the I picture and the I picture is identified, it is possible to cope with a case of the encrypted stream.

The above and other objects and features of the present invention will become apparent from the following detailed description and the appended claims with reference to the accompanying drawings.

DETAILED DESCRIPTION OF THE PREFERRED EMBODIMENT

Figure 1:
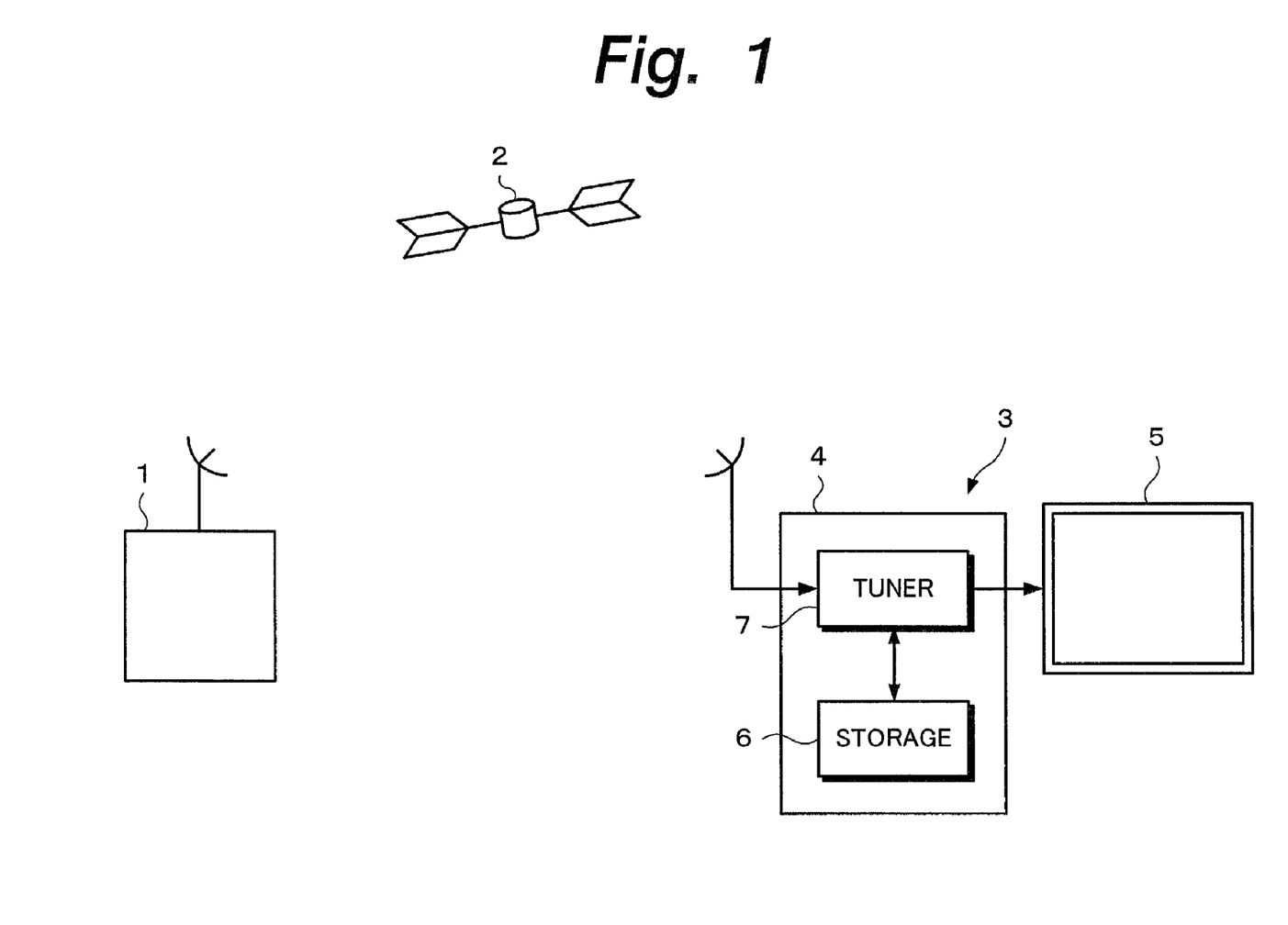
FIG. 1 is a block diagram of an example of an information distribution system to which the invention is applied.

An embodiment of the invention will be described hereinbelow with reference to the drawings. FIG. 1 shows an example of a system for distributing information of contents by using digital BS broadcast. The invention can be applied to such a system. In FIG. 1, reference numeral 1 denotes a broadcast server; 2 a satellite of the digital BS (Broadcast Satellite) broadcast; and 3 a reception terminal.

The broadcast server 1 performs the digital BS broadcast. According to the digital BS broadcast, a video image and an audio sound are digitally broadcasted by using a band of, for example, 12 GHz (frequencies of 11.7 GHz to 12 GHz). In the digital BS broadcast, video data is compressed by the MPEG (Moving Picture Coding Experts Group) 2 system and audio data is compressed by the AAC (Advanced Audio Coding) system. A video packet and an audio packet are assembled in a stream of MPEG2-TS, modulated by, for example, the trellis 8 PSK (Phase Shift Keying) or BPSK (Binary Phase Shift Keying), and transmitted by a desired carrier.

For example, eight transponders having a band of 30 Mbps are installed in the satellite 2. The transponder of 30 Mbps can transmit the contents of, for example, six channels in case of the SDTV (Standard Definition Television) broadcast and transmit the contents of, for example, two channels in case of the HDTV (High Definition Television) broadcast.

In this system, for example, the broadcast of the contents distribution can be performed by using the band which is not used at night.

That is, as mentioned above, in the digital BS broadcast, the band per transponder is set to 30 Mbps and the contents of, for example, six channels can be transmitted in case of the SDTV broadcast and the contents of, for example, two channels can be transmitted in case of the HDTV broadcast by one transponder. In the digital BS broadcast, there is a case where the broadcast has been finished at night and a space band is caused in the transponder. Therefore, a method of performing the broadcast of the contents distribution by effectively using such a space band is considered.

The signal from the broadcast server 1 is received by the reception terminal 3 in each home through the satellite 2. The reception terminal 3 in each home comprises a receiver 4 and a television (TV) receiver 5. The receiver 4 receives the signal transmitted from the broadcast server 1 through the satellite 2, demodulates the MPEG2-TS packet stream, extracts a video packet and an audio packet of a desired channel from the TS (Transport packet) packet stream, and decodes a video signal and an audio signal. The video signal and audio signal decoded by the receiver 4 are supplied to the TV receiver 5, so that a reproduction picture plane is displayed on the TV receiver 5.

A storage unit 7 is provided for the receiver 4. The storage unit 7 is provided for the broadcast of the contents distribution which is sent by effectively using the space band at night.

As mentioned above, in this system, when the ordinary broadcast is finished at night and the space band is caused in the transponder, the broadcast for the contents distribution is performed by using the space band. This signal is received by a tuner unit 6 of the receiver 4 and temporarily stored into the storage device 7. The signal is read out from the storage device 7 and reproduced by the TV receiver 5.

In case of sending the contents from the broadcast server 1, in order to protect the contents, the stream can be encrypted and transmitted. However, if the stream is encrypted and transmitted, the picture type cannot be identified and it is difficult to perform the trick play such as cue/review or the like.

In the embodiment of the invention, therefore, the start marker packet and end marker packet are sent just before and just after the start of the I picture. A unique PID (Packet ID) has been written in each of the start marker packet and end marker packet. The video packet of the I picture is identified by identifying the start marker packet and end marker packet.

Figure 2:
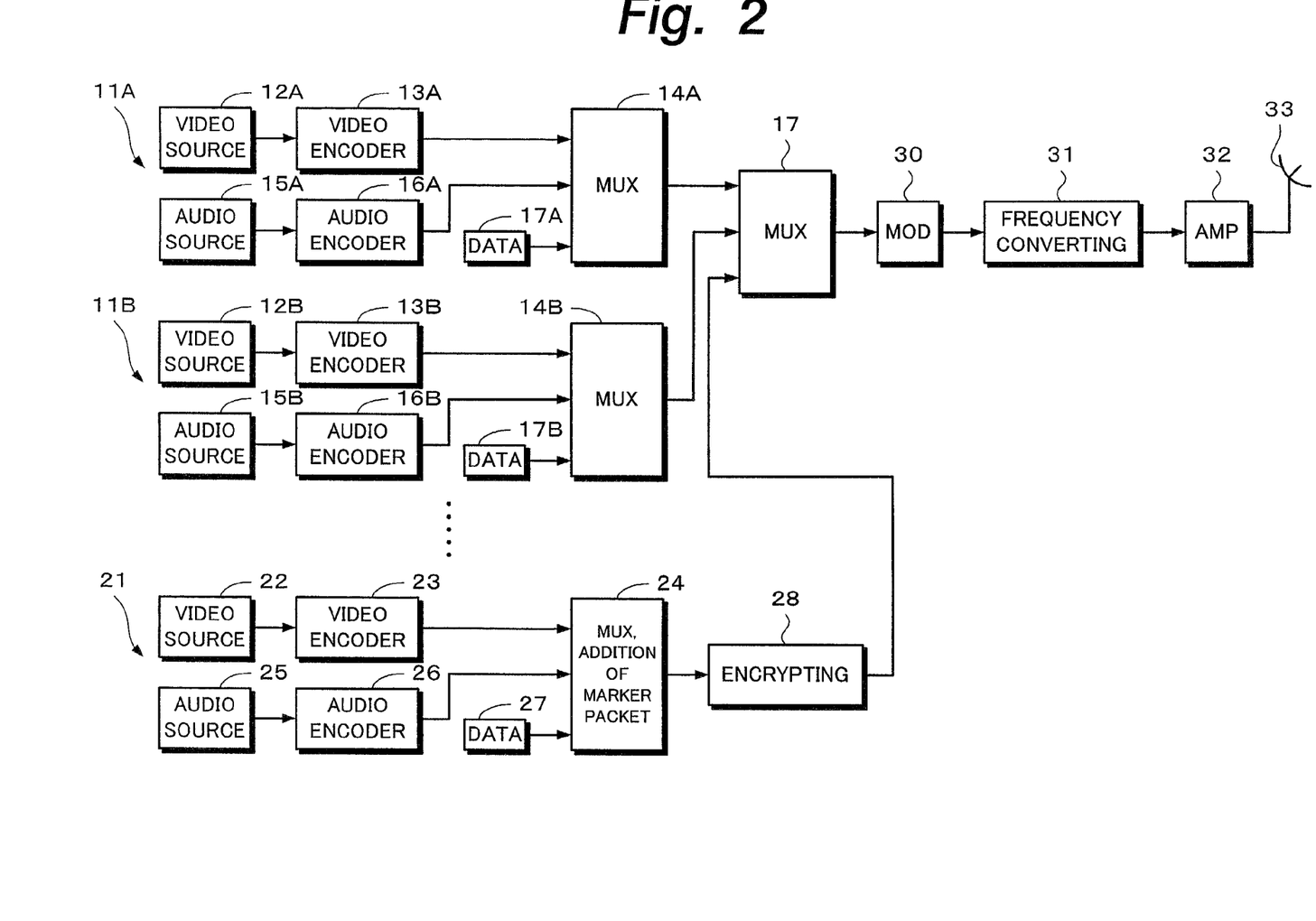
FIG. 2 is a block diagram of an example on the transmission side in the information distribution system to which the invention is applied.

FIG. 2 shows a construction of the broadcast server 1 for performing the broadcast of the contents distribution. In FIG. 2, reference numerals 11A, 11B, . . . denote broadcast signal processing units for performing the ordinary broadcast and 21 indicates a signal processing unit for performing the contents distribution broadcast.

In the broadcast signal processing units 11A, 11B, . . . for the ordinary broadcast, video signals from video sources 12A, 12B, . . . are supplied to video encoders 13A, 13B, . . . , and audio signals from audio sources 15A, 15B, . . . are supplied to audio encoders 16A, 16B, . . . . Video data is compressed in the video encoders 13A, 13B, . . . by the MPEG2 system and video packets are formed. Audio data is compressed in the audio encoders 16A, 16B, . . . by the AAC system and audio packets are formed. PSI (Program Specific Information) such as station selection information, limited reception information, program information, and the like is generated from data generating units 17A, 17B, . . . .

Outputs of the video encoders 13A, 13B, . . . , outputs of the audio encoders 16A, 16B, . . . , and outputs of the data generating units 17A, 17B, . . . are supplied to multiplexers 14A, 14B, . . . . In the multiplexers 14A, 14B, . . . , the video data, audio data, and PSI are multiplexed and assembled into the TS packet having a fixed length of 188 bytes. Outputs of the multiplexers 14A, 14B, . . . are supplied to a multiplexer (MUX) 17.

In the signal processing unit 21 of the contents distribution broadcast, a video signal from a video source 22 is supplied to a video encoder 23 and an audio signal from an audio source 25 is supplied to an audio encoder 26. Video data is compressed by the video encoder 23 by the MPEG2 system and a video packet is formed. Audio data is compressed by the audio encoder 26 by the AAC system and an audio packet is formed. PSI such as station selection information, limited reception information, program information, and the like is generated from a data generating unit 27.

An output of the video encoder 23, an output of the audio encoder 26, and an output of the data generating unit 27 are supplied to a multiplexer 24. In the multiplexer 24, the video data, audio data, and PSI are multiplexed and assembled into a TS packet having a fixed length of 188 bytes.

It is necessary to encrypt contents to be distributed. In this case, an output of the multiplexer 24 is supplied to an encrypting circuit 28 and an encrypting process is performed to a stream. In case of encrypting the stream and transmitting it, a start marker packet and an end marker packet in each of which unique PID has been written are added by the multiplexer 24 just before and just after the I picture so that the I picture can be identified.

In the multiplexer 17, a TS packet of the ordinary broadcast of each channel formed by the broadcast signal processing units 11A, 11B, . . . of each ordinary broadcast and a TS packet of the contents distribution broadcast formed by the signal processing unit 21 of the contents distribution broadcast are multiplexed.

An output of the multiplexer 17 is supplied to a modulating unit 30. In the modulating unit 30, a modulating process is performed by, for example, the trellis 8 PSK or BPSK. An output of the modulating unit 30 is supplied to a frequency converting unit 31. In the frequency converting unit 31, a carrier frequency is converted in accordance with a frequency of the transponder which is used. An output of the frequency converting unit 31 is amplified by an amplifier 32 and outputted from an antenna 33.

In the daytime while the ordinary broadcast is being executed in all of the channels, the broadcast signal processing units 11A, 11B, . . . of the ordinary broadcast are operating and the band of the transponder is used in the channels of the ordinary broadcast. At this time, the contents distribution broadcast is not performed and the signal processing unit 21 of the contents distribution broadcast does not operate.

Several channels of the ordinary broadcast have been finished at night and a space band is caused in the transponder. At this time, among the broadcast signal processing units 11A, 11B, . . . of the ordinary broadcast, the broadcast signal processing units in which the broadcast has been finished do not operate and, in order to perform the contents distribution broadcast, the signal processing unit 21 of the contents distribution broadcast operates.

As mentioned above, a transmitting process of the contents sent by using the space band of the transponder is executed for a time interval while the broadcast has been finished at night.

Figure 3:
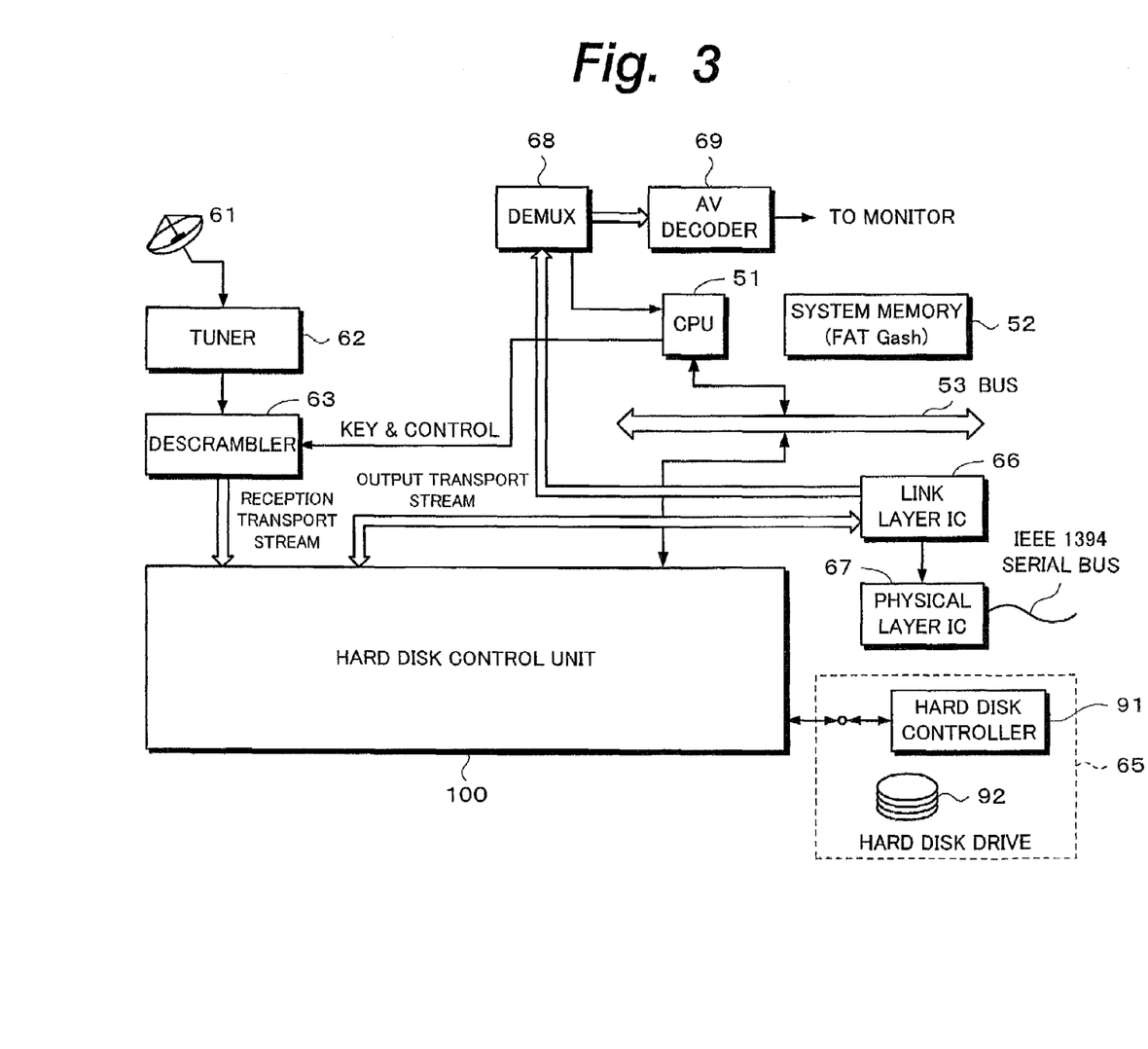
FIG. 3 is a block diagram of an example on the reception side in the information distribution system to which the invention is applied.

FIG. 3 shows a construction of the receiver 4. The receiver has a hard disk drive therein as a storage device for storing the information obtained by receiving the digital satellite broadcast.

In FIG. 3, a digital satellite broadcast wave is received by an antenna 61. The reception signal is outputted to a tuner 62. The tuner 62 performs a demodulation or the like of the reception signal from the antenna 61, obtains a transport stream, and supplies it to a descrambler 63. The descrambler 63 decodes the scramble performed to the transport stream from the tuner 62 by using a decoding key under the control of a CPU 51 and outputs the decoded stream to a hard disk control unit 100.

The transport stream (hereinafter, referred to as a reception transport stream) which is outputted from the descrambler 63 is supplied to the hard disk control unit 100.

In addition to the reception transport stream, a transport stream (hereinafter, referred to as a reproduction transport stream) reproduced from a hard disk 92 of a hard disk drive 65 is supplied to the hard disk control unit 100.

In case of reproducing the reception transport stream, the hard disk control unit 100 selects the reception transport stream in the two inputted transport streams (reception transport stream and reproduction transport stream) and outputs it as an output transport stream to a link layer IC 66.

The link layer IC 66 performs a process of a link layer in a layer structure of the IEEE1394 serial bus or the like to the output transport stream. The link layer IC 66 outputs the output transport stream to a demultiplexer (DEMUX) 68.

A physical layer IC 67 executes a process of the link layer in the layer structure of the IEEE1394 serial bus. When the output transport stream is received from the link layer IC 66, the physical layer IC 67 isochronously transfers the output transport stream to IEEE1394 apparatuses (not shown) through the IEEE1394 serial bus.

The demultiplexer 68 separates the TS packet in which data (a PAT (Program Association Table), a PMT (Program Map Table), a decoding key to descramble the scramble performed to the transport stream, control data which is used for the other control) of a session has been arranged from the TS packet that is outputted from the link layer IC 66. The demultiplexer 68 further analyzes contents of the seprated TS packet and outputs necessary control data to the CPU 51.

The CPU 51 outputs the decoding key in the session data which is supplied from the demultiplexer 68 as mentioned above to the descrambler 63 and controls the descrambler 63 on the basis of data of another session which is likewise supplied from the demultiplexer 68.

The demultiplexer 68 separates the TS packet in which the control data (data of the session) has been arranged from the output transport stream and, further, separates a packet in which video data and audio data (hereinbelow, those data is referred to as AV data) of the program selected when the user operates a remote commander or the like (not shown) has been arranged and outputs it to an AV decoder 69.

The AV decoder 69 decodes the TS packet from the demultiplexer 68 by the MPEG2 and outputs the resultant AV data to a monitor (not shown). Thus, an image and an audio sound as a digital satellite broadcast program are outputted (displayed) from the monitor.

In case of recording the reception transport stream onto the hard disk 92, the hard disk control unit 100 selects the reception transport stream in the two inputted transport streams (reception transport stream and reproduction transport stream).

Figure 4:
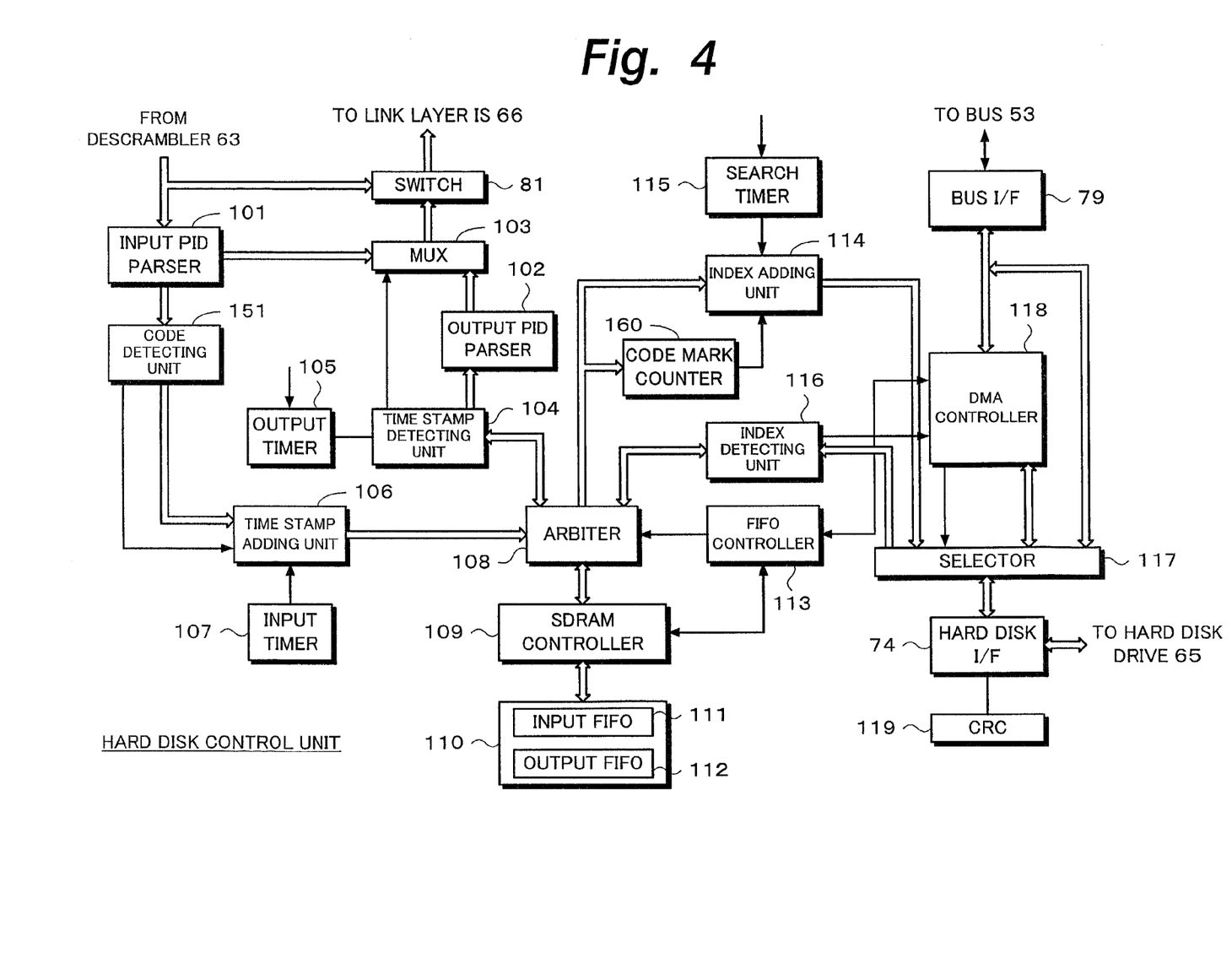
FIG. 4 is a block diagram of an example of a hard disk control unit on the reception side in the information distribution system to which the invention is applied.

That is, as shown in FIG. 4, in the hard disk control unit 100, the reception transport stream from the descrambler 63 is supplied to a switch 81 and an input PID (Packet ID) parser 101. The input PID parser 101 extracts a TS packet to be merely recorded (hereinafter, it is referred to as a recording packet), a TS packet which is recorded and used for controlling (hereinafter, it is referred to as a recording/control packet), and a TS packet which is used only for controlling (hereinafter, it is referred to as a control packet) from the TS packet constructing the reception transport stream from the descrambler 63. The input PID parser 101 outputs the recording packet and recording/control packet to a time stamp adding unit 106 through a code detecting unit 151 and outputs the control packet to a multiplexer 103.

The multiplexer 103 multilexes the TS packet which is outputted from the input PID parser 101 and the TS packet which was reproduced from the hard disk and is outputted from an output PID parser 102 and outputs the multiplexed packet to the switch 81.

The time stamp adding unit 106 adds a time stamp based on a clock that is generated from an input timer 107 to the inputted TS packet. The TS packet to which the time stamp has been added by the time stamp adding unit 106 is supplied to an arbiter 108. The TS packet inputted to the arbiter 108 is stored into an input FIFO 111 of an SDRAM 110 under the control of an SDRAM controller 109. The SDRAM controller 109 controls the writing operation of the packet into the input FIFO 111 of the SDRAM 110 and the reading operation of the packet from an output FIFO 112 of the SDRAM 110 by instructions from an FIFO controller 113.

The TS packet stored in the input FIFO 111 is read out under the control of the SDRAM controller 109 and outputted to an index adding unit 114 through the arbiter 108. The index adding unit 114 adds an index comprising a stamp for searching, an LBA (Logical Block Address), and a user area to a cluster of 128 kbytes as a recording unit to the hard disk 92 and outputs the resultant cluster to a selector 117. Data inputted via a bus interface 79, a command from a DMA controller 118, and the like are also inputted to the selector 117. The selector 117 selects the inputted TS packet, data, command, or the like and outputs the selected one to a predetermined apparatus. For example, the TS packet outputted from the index adding unit 114 and inputted to the selector 117 is outputted to a hard disk interface 74, further, outputted to the hard disk drive 65, and recorded onto the hard disk 92.

In the case where the TS packet recorded onto the hard disk 92 in the hard disk drive 65 as mentioned above is reproduced, the reproduction transport stream as a sequence of the TS packets recorded on the hard disk 92 is read out by a hard disk controller 91 (FIG. 3) and outputted to the hard disk control unit 100. In the hard disk control unit 100, the reproduction transport stream inputted via the hard disk interface 74 is outputted to an index detecting unit 116 via the selector 117.

The index detecting unit 116 detects the index added by the index adding unit 114 from the inputted reproduction transport stream. The detected index is stored into a register in the DMA controller 118. The DMA controller 118 controls the selector 117 on the basis of the stored index.

The index is detected by the index detecting unit 116 and the reproduction transport stream from which the index has been removed is temporarily stored into the output FIFO 112 of the SDRAM 110 through the arbiter 108 and SDRAM controller 109. The reproduction transport stream stored in the output FIFO 112 is read out to the arbiter 108 under the control of the SDRAM controller 109 and, further, outputted to a time stamp detecting unit 104. The time stamp detecting unit 104 detects the time stamp from the inputted reproduction transport stream and outputs the reproduction transport stream to the output PID parser 102 in accordance with the time stamp at a timing of returning a time interval between the TS packets to the original state. The output PID parser 102 receives the reproduction transport stream outputted from the time stamp detecting unit 104, extracts the reproducing packet to be reproduced from the TS packet constructing the reproduction transport stream and outputs it to the multiplexer 103.

The multiplexer 103 multiplexes the TS packet which is outputted from the output PID parser 102 and the TS packet which is outputted from the input PID parser 101 and outputs the multiplexed packet to the link layer IC 66 through the switch 81.

The link layer IC 66 isochronously transfers the reproduction transport stream received from the switch 81 through the physical layer IC 67 via the IEEE1394 serial bus or outputs it to the monitor through the demultiplexer 68 and AV decoder 69.

In the embodiment of the invention, the marker packets are certainly inserted just before and just after the I picture and the marker packets are detected, thereby discriminating the I picture.

That is, in this example, the start marker packet is sent just before the I picture and the end marker packet is sent just after the I picture. Another unique PID (PID=1) which is not used is added to the start marker packet. Another unique PID (PID=2) which is not used is added to the end marker packet.

Figure 5:
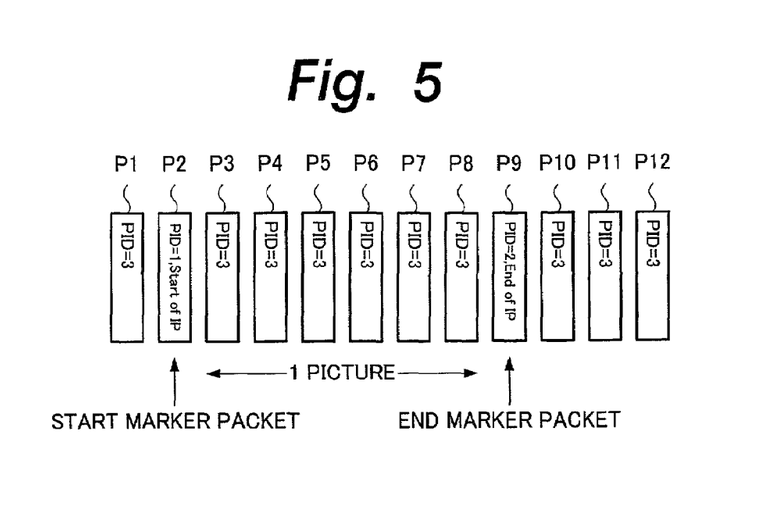
FIG. 5 is a schematic diagram for use in explanation of marker packets.

In the example of FIG. 5, the PID of the TS packet P2 just before the I picture among the TS packets P1, P2, P3, . . . is set to "PID=1". The PID of the TS packet P9 just after the I picture is set to "PID=2". The PIDs of the other TS packets are set to "PID=3" indicative of the video packets of the relevant channels.

Figure 6:
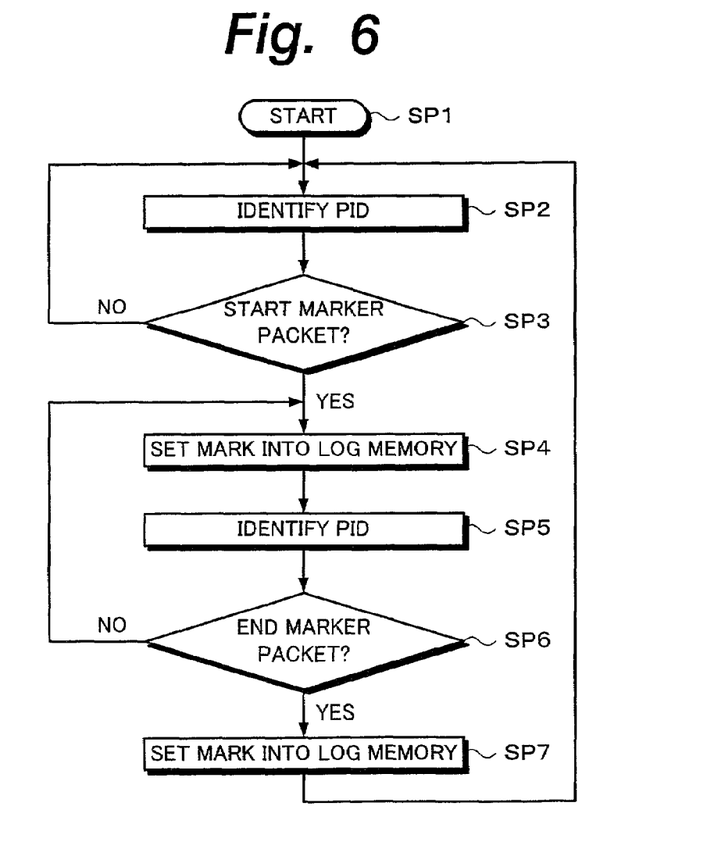
FIG. 6 is a flowchart for use in explanation of an example of a recording process.

That is, as shown in FIG. 6, when the hard disk control unit 100 enters a recording processing procedure onto the hard disk from step SPI, the PID of each TS packet is identified by the input PID parser 101 in subsequent step SP2. Whether the PID indicates the start marker packet or not is discriminated in step SP3. In the example of FIG. 5, the packet of "PID=1" is identified, thereby discriminating whether it is the start marker packet or not. If NO in step SP3, the processing routine is returned to step SP2. The subsequent TS packet is analyzed.

If YES in step SP3, since the TS packet which is being analyzed at this time is the start marker packet, step SP4 follows. A marker indicative of the head of the I picture is set into a log memory showing an address on the hard disk and showing which TS packet has been recorded in this address.

In step SP5, the PID of each TS packet is identified by the input PID parser 101, thereby discriminating whether it indicates the end marker packet or not in step SP6. In the example of FIG. 5, the packet of "PID=2" is identified, thereby discriminating whether it indicates the start marker packet or not. If NO in step SP6, the processing routine is returned to step SP2 and the subsequent TS packet is analyzed.

If YES in step SP6, since the TS packet which is being analyzed at this time is the end marker packet, step SP7 follows and a marker showing the end of the I picture is set into the log memory showing an address on the hard disk.

By the above processing steps, the markers are set into the log memory at the position indicative of the head of the I picture and the position indicative of the end of the I picture. Therefore, by checking the contents in the log memory, it will be understood that the I picture certainly exists between the marker indicative of the head of the I picture on the hard disk and the marker indicative of the end of the I picture.

Upon reproduction (jump reproduction at a high speed) of the trick play, the markers indicative of the head and the end of the I picture are identified from the log memory. The data between the marker indicative of the head of the I picture and the marker indicative of the end of the I picture is read out. Thus, the I picture is certainly reproduced and the trick play can be certainly executed.

In the above example, the I picture can be obtained in the variable speed reproduction by setting the markers to the head and end positions of the I picture by using the log memory. However, index information of each cluster can be also used.

Figure 7:
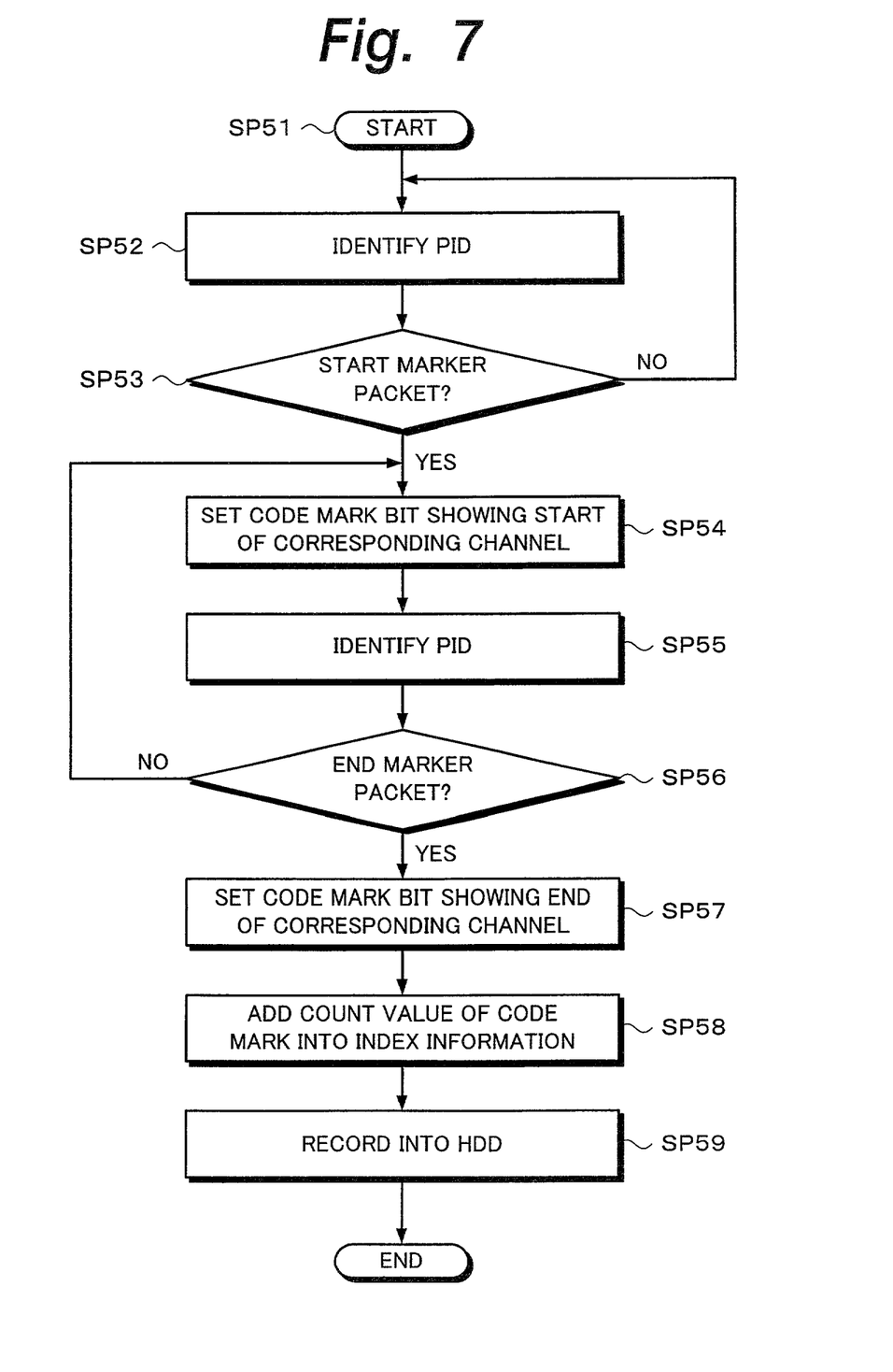
FIG. 7 is a flowchart for use in explanation of another example of a recording process.

That is, as shown in FIG. 7, when the hard disk control unit 100 enters the recording processing procedure onto the hard disk from step SP51, the PID of each TS packet is identified by the input PID parser 101 in subsequent step SP52. Whether it indicates the start marker packet or not is discriminated in step SP53. In the example of FIG. 5, the packet of "PID=1" is identified, thereby discriminating whether it is the start marker packet or not. If NO in step SP53, the processing routine is returned to step SP52 and the subsequent TS packet is analyzed.

If YES in step SP53, since the TS packet which is being analyzed at this time is the start marker packet, the TS packet subsequent thereto is determined as an I picture. The hard disk control unit 100 advances to subsequent step SP54.

When it is determined in step SP53 that the analyzed TS packet is the start marker packet, the hard disk control unit 100 sets a code mark bit indicative of the start of the I picture of the corresponding channel into the further head portion of the time stamp added to the head portion of the TS packet by the time stamp adding unit 106 from the next TS packet in step SP54.

Figure 8A:
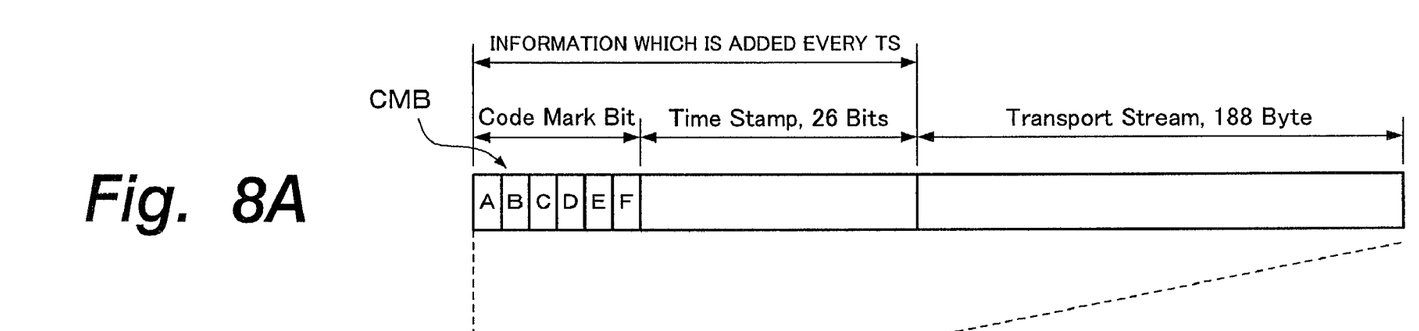
FIGS. 8A and 8B are schematic diagrams for use in explanation of code marks and an index.

That is, as shown in FIG. 8A, the time stamp of 26 bits is added to the head portion of the TS packet of 188 bytes by the time stamp adding unit 106. When the start marker packet is identified, a code mark bit CMB is set from the next TS packet of the start marker packet in step SP54.

The code mark bit CMB has a corresponding bit every channel and a bit corresponding to the channel is set as a code mark.

For example, if the PID of the TS packet which is analyzed at this time indicates the first channel, the first bit (bit at the position of "A" of the code mark bit CMB shown in FIG. 8A) corresponding to the first channel is set as a code mark bit.

The PID of each TS packet is identified in step SP55, thereby discriminating whether it indicates the end marker packet or not in step SP56. In the example of FIG. 5, the packet of "PID=2" is identified, thereby discriminating whether it indicates the end marker packet or not. If NO in step SP56, the processing routine is returned to step SP54.

If YES in step SP56, a code mark bit showing the end of the I picture of the corresponding channel is set by the time stamp adding unit 106.

The processing routine advances to step SP58 and the number of code marks is counted by a code mark counter 160 every cluster as a unit recorded on the hard disk 92.

Figure 8B:
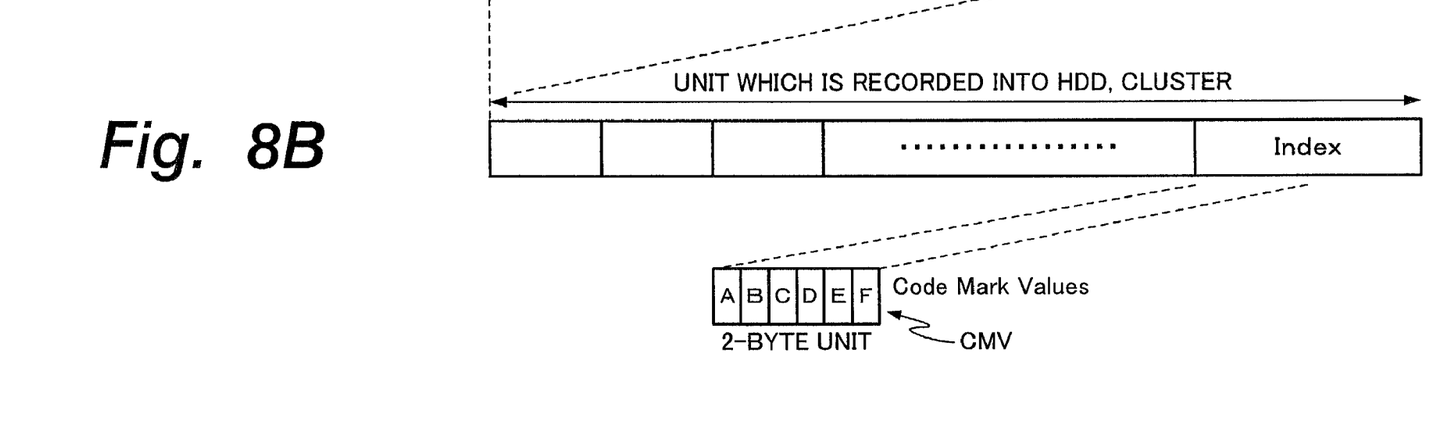

As shown in FIG. 8B, the count result is added as index information of the cluster every channel. The count value (hereinafter, referred to as a code mark value) of the code marks of each channel is described on a 2-byte unit basis.

When the code mark value is described in the index as mentioned above, the hard disk control unit 100 advances to step SP58 and sends each cluster to the hard disk drive 65, thereby recording it onto the hard disk 92. The processing procedure is finished in step SP59.

In a state where each TS packet has been recorded onto the hard disk 92 on a cluster unit basis as mentioned above, a case of reproducing the stream of a predetermined channel from the hard disk 92 by a trick play (jump reproduction at a high speed) will now be described.

Figure 9:
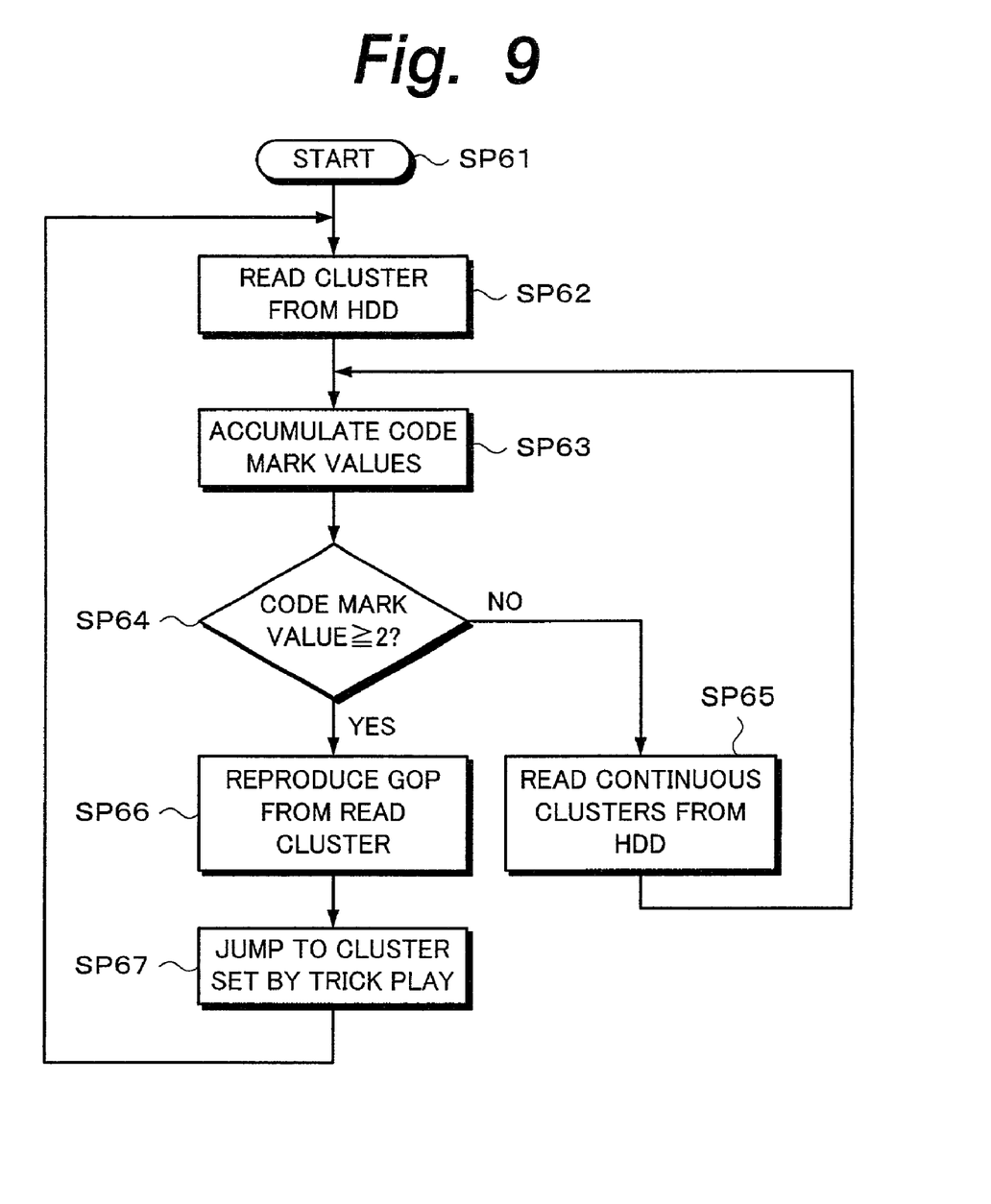
FIG. 9 is a flowchart for use in explanation of a reproducing process.
Figure 10A:
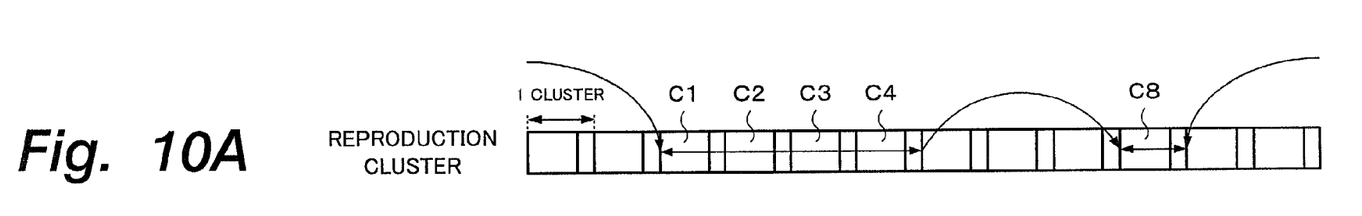
FIGS. 10A to 10D are schematic diagrams for use in explanation of the reproducing process.
Figures 10B, 10C, 10D:
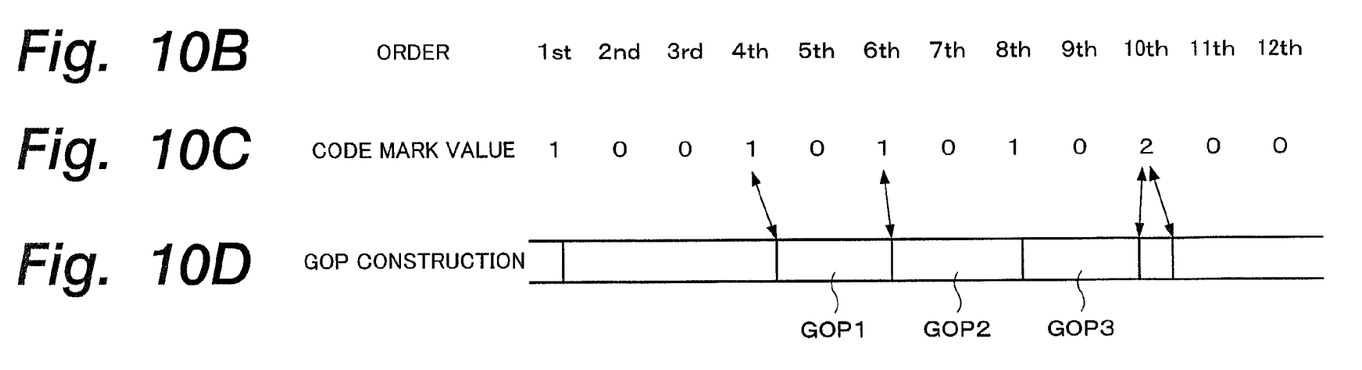

When the trick play is designated by the input operation of the user, as shown in FIG. 9, the DMA controller 118 of the hard disk control unit 100 enters a trick play processing procedure from step SP61 and reads out the cluster from the hard disk 92 in subsequent step SP62.

In step SP63, the index detecting unit 116 detects the index from the cluster read out from the hard disk 92 and accumulates the code mark value written in the detected index into the channel to be reproduced in this instance. That is, the code mark corresponding to the channel to be reproduced at this time is detected from the code mark value CMV described on a 2-byte unit basis every channel mentioned in conjunction with FIG. 8B and accumulated.

When an accumulation result of the code mark value indicates "1", this means that one packet including the I picture exists in the TS packet in the cluster C2 (FIGS. 10A to 10D) read out in this instance. In this case, it will be understood that the head of the GOP exists in the cluster read out at this time on the basis of the feature of the GOP structure where the I picture is located at the head.

In this case, the DMA controller 118 further advances to step SP65, the cluster C3 sequel to the read-out cluster C2 is read out, and further accumulates the code mark value of the read-out cluster into the previously accumulated result.

The DMA controller 118 repeats the processes in steps SP63, SP64, and SP65. When the accumulation value of the code mark value is equal to 2 or more, this means that two or more TS packets including the start code of the I picture exist in the clusters which were continuously read out so far (for example, the clusters C1, C2, C3, and C4 as shown in FIGS. 10A to 10D), that is, the heads of the two GOPs exist and at least one perfect GOP1 exists. The DMA controller 118 advances from step SP64 to SP65 and reproduces the GOP-included in the cluster in which the code mark has been accumulated at this time.

Thus, one perfect GOP is reproduced. When the GOP is reproduced, the DMA controller 118 advances to step SP67 and jumps a predetermined number of clusters to be jumped in the trick play mode. In step SP62, the cluster C8 is read out from the hard disk 92. In hard disk control unit 100, after a plurality of clusters including the GOP are read out, the predetermined number of clusters are jumped, so that the trick play can be executed.

In the above construction, when the transport stream is reproduced from the hard disk 92, the hard disk control unit 100 reproduces it while jumping a predetermined number of images among the continuous images, thereby enabling the trick play (high speed reproduction) to be executed. In this case, among the pictures constructing the GOP, since the B picture or P picture which forms an image by referring to the front and back pictures cannot construct the image by itself, it is necessary to reproduce one perfect GOP including the I picture. Therefore, by starting the reproduction from the cluster on the side jumped by the trick play and reading out the continuous clusters until one perfect GOP is read out, the perfect images corresponding to one GOP can be reproduced by reproducing the read-out GOP.

According to the invention, since the I picture is identified by using the marker packets of the unique PIDs, it is possible to cope with a case where the transport stream has been encrypted and transmitted. The invention can be also applied to a case where the transport stream is not encrypted.

In the above example, although the start marker packet and the end marker packet are added just before and just after the I picture, only the start marker packet can be also provided just before the I picture.

The position of the marker packet is not necessarily limited to the positions just before and just after the I picture so long as the position of the I picture can be specified. Assuming that an arbitrary number n is equal to a predetermined number and the marker packet can be also added to the position that is n I pictures before the present I picture.

According to the invention, the start marker packet and the end marker packet are sent just before and just after the start of the I picture. The unique PID has been written in each of the start marker packet and the end marker packet. Upon reception, the video packet of the I picture is identified by identifying the start marker packet and the end marker packet.

Upon recording, the markers are set into the log memory at the start and end positions of the I picture. Upon reproduction, the cluster including the TS packet of the I picture can be known from the contents in the log memory, so that the trick play can be executed.

According to the invention, upon recording, the TS packet of the I picture is detected from the start marker packet and the end marker packet and the code mark is set into the TS packet of the I picture. When the data is recorded into the hard disk drive on a cluster unit basis, the number of code marks is counted and the count value of the code mark is added to the index information. Upon reproduction, the cluster including the TS packet of the I picture can be known from the index information, so that the trick play can be executed.

As mentioned above, according to the invention, since the I picture is identified by sending the start marker packet and the end marker packet each having the unique PID just before and just after the start of the I picture, it is also possible to cope with the case of the encrypted stream.

The present invention is not limited to the foregoing embodiment but many modifications and variations are possible within the spirit and scope of the appended claims of the invention.

What is claimed is:

1. An information processing method whereby a stream of a video packet comprising image data encoded in a frame or a field, image data encoded between forward directional frames or fields, and image data encoded between bidirectional frames or fields is received and recorded into a storage device, comprising the steps of:

detecting a first marker packet which is sent just before a transport stream packet including an intraframe or intrafield encoded image from said received stream;

detecting a second marker packet which is sent just after said transport stream packet including said intraframe or intrafield encoded image; and identifying said transport stream packet including said intraframe or intrafield encoded image from said first marker packet and said second marker packet;

wherein the first marker packet includes a unique single quantity packet identifier and the second marker packet includes a unique single quantity packet identifier not otherwise used in transport stream packets in the received stream.

2. A method according to claim 1, wherein said received stream has been encrypted.

3. A method according to claim 1, wherein recording position information at the head of said intraframe or intrafield encoded image data in said storage device is stored on the basis of a result of said identification.

4. A method according to claim 3, wherein upon reproduction, a recording unit including said intraframe or intrafield encoded image data is reproduced from said storage device on the basis of the recording position information at the head of said intraframe or intrafield encoded image data, thereby performing a variable speed reproduction.

5. An information recording and reproducing method whereby a stream of a video packet comprising image data encoded in a frame or a field, image data encoded between forward directional frames or fields, and image data encoded between bidirectional frames or fields is recorded into a storage device on a unit basis of a predetermined number of recording units and said stream is reproduced from said storage device, comprising the steps of:

detecting a first marker packet which is sent just before a transport packet including an intraframe or intrafield encoded image from said received stream;

detecting a second marker packet which is sent just after the transport packet including said intraframe or intrafield encoded image;

identifying the transport packet of said intraframe or intrafield encoded image data from said first marker packet and said second marker packet;

adding information showing said intraframe or intrafield encoded image data on the basis of a result of said identification;

counting said added information showing said intraframe or intrafield encoded image data every recording unit into said storage device; and adding a result of said counting every recording unit into said storage device;

wherein the first marker packet includes a unique single quantity packet identifier and the second marker packet includes a unique single quantity packet identifier not otherwise used in transport packets in the received stream.

6. A method according to claim 5, wherein said stream to be recorded has been encrypted.

7. A method according to claim 5, wherein upon reproduction, the recording unit including said intraframe or intrafield encoded image data is reproduced from said storage device on the basis of a result of said counting added every said recording unit and a variable speed reproduction is performed.

8. An information processing apparatus in which a stream of a video packet comprising image data encoded in a frame or a field, image data encoded between forward directional frames or fields, and image data encoded between bidirectional frames or fields is received and recorded into a storage device, comprising:

- means for detecting a first marker packet which is transmitted just before a transport stream packet including an intraframe or intrafield encoded image from said received stream;
- means for detecting a second marker packet which is transmitted just after the transport stream packet including said intraframe or intrafield encoded image; and
- means for identifying said transport stream packet including said intraframe or intrafield encoded image from said first marker packet and said second marker packet;
- wherein the first marker packet includes a unique single quantity packet identifier and the second marker packet includes a unique single quantity packet identifier not otherwise used in transport packets in the received stream.

9. An apparatus according to claim 8, wherein said received stream has been encrypted.

10. An apparatus according to claim 8, further having holding means for holding recording position information at the head of said intraframe or intrafield encoded image data in said storage device on the basis of a result of said identification.

11. An apparatus according to claim 10, wherein upon reproduction, a recording unit including said intraframe or intrafield encoded image data is reproduced from said storage device on the basis of said recording position information at the head of said intraframe or intrafield encoded image data, and a variable speed reproduction is performed.

12. An information recording and reproducing apparatus in which a stream of a video packet comprising image data encoded in a frame or a field, image data encoded between forward directional frames or fields, and image data encoded between bidirectional frames or fields is recorded into a storage device on a unit basis of a predetermined number of recording units and said stream is reproduced from said storage device, comprising:

- means for detecting a first marker packet which is transmitted just before a transport packet including an intraframe or intrafield encoded image from said received stream;
- means for detecting a second marker packet which is transmitted just after the transport packet including said intraframe or intrafield encoded image;
- means for identifying the transport packet of said intraframe or intrafield encoded image data from said first marker packet and said second marker packet;
- means for adding information indicative of said intraframe or intrafield encoded image data to said transport packet on the basis of a result of said identification;
- means for counting the information showing said added intraframe or intrafield encoded image data every recording unit into said storage device; and
- means for adding a result of said counting every recording unit into said storage device;
- wherein the first marker packet includes a unique single quantity packet identifier and the second marker packet includes a unique single quantity packet identifier not otherwise used in transport packets in the received stream.

13. An apparatus according to claim 12, wherein said stream to be recorded has been encrypted.

14. An apparatus according to claim 12, wherein upon reproduction, the recording unit including said intraframe or intrafield encoded image data is reproduced from said storage device on the basis of said count result added every said recording unit, and a variable speed reproduction is executed.

* * * * *